Patented Dec. 3, 1946

2,411,875

UNITED STATES PATENT OFFICE 2,411,875

BETA-HALO ACYL HALIDES

Thomas L. Gresham and Forrest W. Shaver, Akron, Ohio, assignors to The B. F. Goodrich Company, New York, N. Y., a corporation of New York No Drawing. Application June 30, 1945, Serial No. 602,686

6 Claims. (Cl. 260—544)

This invention relates to the preparation of beta-halo acyl halides and has specific reference to the preparation of beta-halo acyl halides from beta lactones.

We have discovered that beta-halo acyl halides can be readily prepared by the reaction of a beta lactone with a halide of an inorganic oxy-acid anhydride containing two or more halogens either in the presence of an inert reaction diluent or in the complete absence of a reaction diluent.

The reaction involving a beta lactone and an inorganic oxy-acid anhydride containing two or more halogens may be illustrated by the following equation:

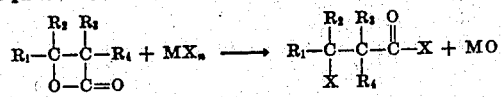

where $MX_n$ represents the halide of an inorganic oxy-acid anhydride containing at least two halogens, and where $R_1$, $R_2$, $R_3$, and $R_4$ represent hydrogen or an organic residue linked to the carbon atoms such as aryl, alkyl, aralkyl, or alkylaryl groups. The organic residue radicals can also be substituted with such groups as nitro, hydroxy, carboxy acid, amino, etc. The organic radicals may be also carboxylic acid groups and the like.

In case $R_1$, $R_2$, $R_3$, or $R_4$ contain groups which may also be halogenated during the process of opening the lactone ring and forming the beta-halo acyl halide according to our invention, the quantity of the halide of the inorganic oxy-acid anhydride may need be increased to provide sufficient for both types of reaction. The additional halogenation gives rise to additional types of beta-halo acyl halides which results in further broadening of the scope of their use.

The halogenating agents which can be employed according to our invention are the halides of oxy-acid anhydrides of the elements of groups V and VI of the periodic table which may or may not have all the oxygen replaced by halogen atoms as in such compounds as phosphorus trichloride, phosphorus oxy chloride, phosphorus penta chloride, sulfuryl chloride, thionyl chloride, and other halides and oxy halides of the elements of these two periodic groups.

In carrying out the preferred method of preparing the new compounds with which our invention is concerned, the halide of an inorganic oxy-acid anhydride is charged into a suitable reaction vessel as a liquid or, when a solid, dissolved in a solvent which is inert to the halide and also to the lactone. The beta lactone is then added slowly over a period of time so as to avoid an appreciable rise in temperature of the reaction mixture. The reactions take place quite readily at room temperature and will produce beta-halo acyl halides in substantially quantitative yields with the usual care, observation and supervision in agreement with good production procedure. It is obvious from the nature of the reactants that moisture must be excluded from the reaction mixture, not because the reaction will be inhibited by the presence of the moisture, but because of the dissipation of the halogenating agents by their reaction with the moisture. After the reaction is complete, the beta-halo acyl halide is recovered and purified by distillation.

The invention is further illustrated by the following specific examples:

Example I

There is charged into a reaction vessel fitted with a stirring device, a water bath for cooling, a dropping funnel, and a condenser cooled with a mixture of Dry Ice (solid carbon dioxide) and acetone 1.2 molecular equivalents of thionyl chloride. 1.0 molecular equivalent of beta-propiolactone is added over a period of about 3 hours by means of the dropping funnel. As the reaction progresses, the sulfur dioxide produced by the reaction has a tendency to entrain a portion of the beta-chloro acyl chloride being formed, but the condenser strips out the beta-chloro acyl chloride and allows the sulfur dioxide to pass on through to the atmosphere. When the addition of the beta lactone is complete, the reaction mixture is allowed to stand for a short period of time. Any excess thionyl chloride is then removed while heating the mixture remaining in the reaction flask prior to the recovery of the product which is accomplished by distillation at reduced pressure. Beta-chloropropionyl chloride is recovered in a nearly quantitative yield varying from 87.5% to 95% at a boiling point of 80–83° C. at 100 mm. Hg. There is no evidence of any unreacted lactone.

Example II 105 parts by weight of phosphorus pentachloride are dissolved in carbon tetrachloride and placed in a vessel cooled by an ice bath provided with a dropping funnel and a condenser ending in a drying tube. 36 parts by weight of beta propiolactone are added at a rate sufficiently slow to avoid an appreciable rise in temperature of the reaction mixture. A 93% yield of the reaction product, beta-chloropropionyl chloride is obtained as above. To further identify the product of the reaction of beta-propiolactone with the halides of oxy-acid anhydrides, beta-chloropropionyl chloride is converted to beta-chloropropionic acid. The boiling point of the beta-chloropropionic acid formed in this manner is 110° C. at 15 mm. Hg which is consistent with the boiling point temperatures at various pressures disclosed in the literature.

Other halides of oxy-acid anhydrides of groups V and VI can be used in place of thionyl chloride or phosphorus pentachloride in the reaction with beta propiolactone to produce beta-halo propionyl halides. The halogenating agents of the type used in the preparation of acyl halides above mentioned such as phosphorus trichloride, phosphorus oxy chloride, sulfuryl chloride, phosphorus pentabromide, and others can be employed. Likewise these halogenating agents can be used with other beta lactones.

Among the beta lactones that can be halogenated to their corresponding beta-halo acyl halides in the manner described above are such beta lactones as beta butyrolactone, isobutyrolactone, alpha methyl propiolactone, beta isovalerolactone, alpha dimethyl propiolactone beta carboxylic acid, trimethyl propiolactone beta carboxylic acid, beta dimethyl propiolactone alpha carboxylic acid, trimethyl propiolactone alpha carboxylic acid, beta nitrophenyl (ortho, meta and para) propiolactones, beta (orthonitro para isopropylphenyl) propiolactone, beta (orthonitro metamethoxyphenyl) propiolactone, alpha-oxy beta-phenyl propiolactone, and others.

The beta-halo acyl halides formed according to our invention are useful intermediate materials which can be employed in the synthesis of many organic compounds because of the presence of at least two halogen atoms among other functional groups which may be present. For example these beta-halo acyl halides may be employed as intermediates for the formation of acrylic acid and substituted acrylic acids, among other uses known to those versed in the art of organic synthesis.

While we have herein described certain preferred manners of performing our invention, we do not thereby desire or intend to limit ourselves solely thereto, for, the precise proportions of the materials utilized may be varied and, as hitherto stated, other materials having equivalent chemical properties may be employed, if desired, without departing from the spirit and scope of the invention as defined in the appended claims.

We claim:

1. A method of producing a beta-halo acyl halide which comprises reacting a beta lactone with a halide of a substance selected from the group consisting of oxy-acid anhydrides of elements of the periodic groups V and VI.

2. A method of producing a beta-chloroacyl chloride which comprises reacting a beta lactone with a chloride of a substance selected from the group consisting of oxy-acid anhydrides of elements of the periodic groups V and VI.

3. A method of producing a beta-chloroacyl chloride which comprises reacting a beta lactone with thionyl chloride.

4. A method of producing a beta-chloroacyl chloride which comprises reacting a beta lactone with phosphorus pentachloride.

5. A method of producing beta-chloropropionyl chloride which comprises reacting beta propiolactone with thionyl chloride.

6. A method of producing beta-chloropropionyl chloride which comprises reacting beta propiolactone with phosphorus pentachloride.

THOMAS L. GRESHAM.
FORREST W. SHAVER.